US012634655B2

(12) United States Patent     (10) Patent No.:   US 12,634,655 B2

Long, II     (45) Date of Patent:    May 19, 2026

(54) WIRELESS BEACON LOCATOR

(71) Applicant: Qwake Technologies, Inc., San Francisco, CA (US)

(72) Inventor: John Davis Long, II, New York, NY (US)

(73) Assignee: Qwake Technologies, Inc., San Francisco, CA (US)

( * ) Notice: Subject to any disclaimer, the term of this patent is extended or adjusted under 35 U.S.C. 154(b) by 495 days.

(21) Appl. No.: 18/126,847

(22) Filed: Mar. 27, 2023

(65) Prior Publication Data

US 2026/0122449 A1    Apr. 30, 2026

Related U.S. Application Data

(60) Provisional application No. 63/438,412, filed on Jan. 11, 2023.

(51) Int. Cl.
   *H04W 4/024*      (2018.01)
   *H04W 4/90*       (2018.01)

(52) U.S. Cl.
   CPC ............. *H04W 4/024* (2018.02); *H04W 4/90* (2018.02)

(58) Field of Classification Search
   CPC ....... H04W 4/024; H04W 4/90; H04W 4/029; H04W 4/02; H04W 4/80; H04W 4/50; H04W 4/33; H04W 4/30
   See application file for complete search history.

(56) References Cited

U.S. PATENT DOCUMENTS

| | | | | |
|---|---|---|---|---|
| 7,298,327 B2 * | 11/2007 | Dupray | ................. | G01S 5/0278 |
| | | | | 342/451 |
| 2020/0175842 A1 * | 6/2020 | Merjanian | ............... | G06F 3/011 |
| 2021/0136553 A1 * | 5/2021 | Pope | .................... | G08B 25/016 |

OTHER PUBLICATIONS

3M "3M Scott Pak-Tracker Firefighter Locator System," Scott Fire & Safety, 2022, pp. 1-4.
3M "3M Scott Pak-Tracker Firefighter Locator System Bid Specification," Scott Fire & Safety, 2019, pp. 1-2.
3M "3M Scott Pak-Tracker Firefighter Locator System Features and Benefits," Scott Fire & Safety, 2018, pp. 1.

* cited by examiner

*Primary Examiner* — Umair Ahsan
(74) *Attorney, Agent, or Firm* — Marton Ribera Schumann & Chang LLP; Chien-Ju Alice Chuang

(57)         ABSTRACT

Techniques for navigating a user to a wireless beacon may include generating probable beacon locations, updating a prior probability for each of the probable beacon locations; receiving, by a wireless beacon locator, wireless beacon transmission data including a wireless beacon power reading, computing a distance and a predicted power level for each of the probable beacon locations, the predicted power level being a function of the distance as determined by an emergency response navigation system based on user movement information, updating a likelihood probability for the probable beacon locations using a probability model, determining a highest probable beacon location, and generating a recommended navigation action. The recommended navigation action may be displayed as an arrow icon on a heads-up display or other output device. A wireless meter may be used to obtain wireless beacon power readings from the wireless beacon.

20 Claims, 8 Drawing Sheets

Emergency Response Navigation System 200

Sensor 206a

Sensor 206b

Sensor 206c

Processor Complex 201

Memory 202

Communication Interface 208

Cognitive Enhancement Engine 210

Processor 204

Output Device 212

215

216

218

206

224

222

230

Navigation and Communications System 232a

Navigation and Communications System 232b

Navigation and Communications System 232c

Network 250

234

Sensor Data & Analytics Repository 220

242

Cloud Service 240

500

WIRELESS BEACON LOCATOR

CROSS-REFERENCE TO RELATED APPLICATIONS

This application claims priority to U.S. Patent Application No. 63/438,412 entitled "A Wireless Beacon for Proximity Detection," filed Jan. 11, 2023, the contents of which are hereby incorporated by reference in their entirety.

BACKGROUND OF INVENTION

In high stress and oftentimes hazardous work environments-firefighting, search and rescue, oil and gas, fighter pilots, mining, special ops, and the like-workers and other personnel often need to navigate as a team in an environment where it is very difficult, if not impossible, for team members to locate each other through visual or verbal means. Often team members are too dispersed, either due to hazards, obstacles, or size of operating location, to maintain visual or verbal contact. Even where radio contact is available, in many hazardous environments (e.g., fire and other disaster environments) it may not be possible for a team member to accurately describe their location, particularly relative to others to aid in navigating quickly and efficiently to a desired location.

Also, the operating locations might be remote where conventional location tracking technologies (e.g., GPS and cellular) are unreliable (i.e., intermittent or insufficient resolution). Other persons (e.g., jogger, hiker, adventurer) also trek into remote areas and often get lost in locations where conventional location tracking technology is unreliable. While conventional GPS and cellular triangulation methods work well enough within urban environments, they often perform poorly in remote locations or in a disaster situation.

Thus, there is a need for a higher resolution wireless beacon locator for improved navigation to a wireless beacon location.

BRIEF SUMMARY

The present disclosure provides techniques for navigating to a wireless beacon location. A method for navigating a user to a wireless beacon may include: generating a plurality of probable beacon locations; updating a prior probability for each of the plurality of probable beacon locations; receiving, by a wireless beacon locator, wireless beacon transmission data comprising a wireless beacon power reading; computing a distance and a predicted power level for each of the probable beacon locations, the predicted power level being a function of the distance as determined by an emergency response navigation system based on user movement information; updating a likelihood probability for each of the plurality of probable beacon locations using a probability model, based on at least the predicted power level and the wireless beacon power reading; determining a highest probable beacon location of the plurality of probable beacon locations; and generating a recommended navigation action. In some examples, the method may also include: receiving updated wireless beacon transmission data comprising an updated wireless beacon power reading; and computing an updated distance and an updated predicted power level for each of the probable beacon locations based on updated user movement information determined by the emergency response navigation system; and updating the likelihood probability for the plurality of probable beacon locations based on at least the updated predicted power and the updated wireless beacon power reading.

In some examples, the wireless beacon comprises a Wi-Fi hotspot. In some examples, the plurality of probable beacon locations comprises a plurality of locations within a circular radius of the user. In some examples, the plurality of probable beacon locations comprises a plurality of locations within a spherical radius of the user. In some examples, the recommended navigation actions comprises a recommended direction. In some examples, the method also includes displaying an indication of the recommended direction relative to the user. In some examples, the indication of the recommended direction is displayed using an arrow icon on a heads-up display (HUD). In some examples, updating the likelihood probability for the plurality of probable beacon locations comprises modeling a noise factor, wherein the noise factor represents one or more obstacles. In some examples, the method also includes receiving additional input, wherein determining the highest probable beacon location may be based further on the additional input. In some examples, the additional input comprises a map. In some examples, the additional input comprises a building schematic. In some examples, the additional input comprises a weather condition.

A system for navigating to a wireless beacon may include: a wireless meter configured to detect power from a wireless beacon and to provide a wireless beacon power reading; a memory configured to store instructions and data; and a processor communicatively coupled to the memory, the processor configured to execute instructions to: generate a plurality of probable beacon locations; update a prior probability for the plurality of probable beacon locations; receive, by a wireless beacon locator, wireless beacon transmission data comprising a wireless beacon power reading; compute a distance and a predicted power level for each of the probable beacon locations, the predicted power level being a function of the distance as determined by an emergency response navigation system based on user movement information; update a likelihood probability for the plurality of probable beacon locations using a probability model, based on at least the predicted power level and the wireless beacon power reading; determine the highest probable beacon location of the plurality of probable beacon locations; and generate a recommended navigation action. In some examples, the wireless beacon comprises a WiFi hotspot. In some examples, the wireless beacon is activated automatically based on a health status of a user having the wireless beacon. In some examples, the health status indicates the user is downed and unable to move from the user's location. In some examples, the health status indicates the user is unconscious. In some examples, the wireless beacon is activated manually by a user having the wireless beacon. In some examples, the wireless beacon is activated remotely by a command and control device used to monitor a health status of a user having the wireless beacon.

BRIEF DESCRIPTION OF THE DRAWINGS

Various non-limiting and non-exhaustive aspects and features of the present disclosure are described herein below with references to the drawings wherein.

Figure 1A:
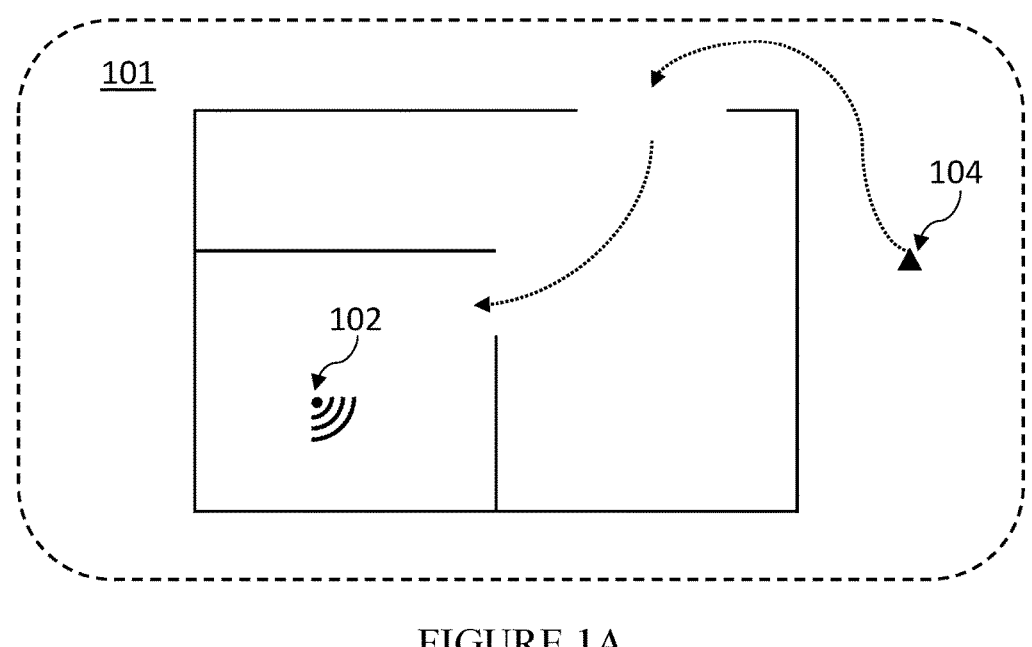
FIG. 1A is a map showing an exemplary wireless beacon location relative to a starting location of a response personnel in a 2D setting, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to techniques for navigating to a wireless beacon location. The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The invention is directed to a wireless beacon locator. The wireless beacon locator may comprise a wireless meter or any other device capable of detecting a strength of a wireless signal (e.g., WiFi meter, sound level meter, wireless receiver) and computing resources configured to process data from the wireless meter and an emergency response navigation system. The wireless beacon locator may be configured to navigate the emergency response personnel to the wireless beacon (e.g., recommending a next motion, direction of movement, and the like) using a detected power from the wireless beacon and the emergency response navigation system. A wireless beacon may comprise any kind of wireless transmitter (e.g., audio waves, radio waves, microwave, etc.), which may be activated at a target location (e.g., a site of a downed emergency response personnel and/or other person needing rescue), either locally (e.g., manually by a user at the target location, automatically by an emergency response personnel local tracking system) or remotely (e.g., by an off-site emergency response coordinator or other offsite personnel, for example, manning a command and control device, as described herein). An emergency response navigation system may comprise a navigation system configured to estimate and/or track an emergency response personnel's trajectory over time (e.g., a helmet-mounted navigation and communications system, a handheld GPS device). In some examples, the emergency response navigation system may include navigation intelligence (e.g., artificial intelligence (AI)), one or more sensors, one or more processors, and other compute functionality. In some examples, the wireless beacon locator also may comprise an output device (e.g., a HUD, screen on handheld device, etc.), for example, configured to display a navigation recommendation (e.g., a relative location map, a heat map, a direction, a next motion, and the like). In some examples, the output device may be shared with the emergency response navigation system (e.g., capable of toggling between, or otherwise displaying, multiple displays or visuals).

A method for navigating to the wireless beacon may include receiving, by a wireless beacon locator, wireless beacon transmission data comprising a wireless beacon power reading (i.e., detected power), generating a plurality of probable beacon locations using a probabilistic model, receiving updated wireless beacon transmission data, computing a distance and a predicted power level for each of the probable beacon locations, determining the highest probable beacon location of the plurality of probable beacon locations (e.g., by comparing the relative probabilities of the plurality of probable beacon locations and computing the $$\log\left(\frac{B_i}{dB(t)}\right)$$

with the most probability), and generating a recommended navigation action (e.g., a next motion, an absolute or relative direction, etc.) based on the highest probable beacon location. In some examples, the predicted power level may be based on historical wireless beacon transmission data (e.g., wireless power readings) and historical action data for the wireless beacon locator itself (e.g., movements made). If a wireless beacon location is not yet within a threshold proximity of a sensor of the wireless beacon locator, the process returns to receiving the wireless beacon transmission data and continues to generate a next recommended navigation action based on an updated highest probable beacon location.

In some examples, the probabilistic model may comprise a Bayesian model configured to consider a time history of detected power (e.g., dB) and to determine a most probable direction and distance (i.e., highest probable location) based on a relationship between distance and detected power (e.g., precomputed), as well as the time history of detected power. An example probabilistic model may be represented as:

$$\mathrm{Prob}(B_i|dB(t)) \propto \mathrm{Prob}(B_i) * \mathrm{Prob}(dB(t)|Bi)$$

In this example, a posterior probability is represented as $\mathrm{Prob}(B_i|dB(t))$ (e.g., the probability of a probable beacon location $B_i$ given received power level readings from the wireless beacon over time), a prior probability as $\mathrm{Prob}(B_i)$, and a likelihood (e.g., predicted) probability as $\mathrm{Prob}(dB(t) |B_i)$ (e.g., the probability of a next power level reading from the wireless beacon given the probable beacon location $B_i$). In this way, a relationship between a user's motion and changes in power readings may be modeled, and actual changes in power readings may be compared against prior likelihood (i.e., hypothesized) probabilities. The prior probability may be based on spatial information about the wireless beacon antenna (e.g., starting with an initial condition of an estimated approximate distance as a function of an initial wireless power reading from the wireless beacon), subsequent prior probabilities being based on one or more previous posterior probabilities in view of one or more previous wireless power reading or a time history of previous wireless power readings. In some examples, an initial prior probability may be uniform for all probable beacon locations $B_i$s. An example likelihood probability may be represented as:

$$Prob(\mathrm{dB}(t)|\mathrm{Beacon}_i) \sim N(\mu_{B_i}, \sigma_B) = \frac{1}{\sigma_B \sqrt{2\pi}} \exp^{-1/2} \left( \frac{\mathrm{dB}(t) - f_B(dist_i)}{\sigma_B} \right)$$

where N may be a Gaussian distribution, dB(t) comprises power readings over time, $f_B$ represents distance, noise is modeled by $\sigma_B$, and $$\mu_B = f_B(dist_i) \triangleq \text{relationship between distance and detectable power}$$

Distance $dist_i$ and predicted power level $f_B(dist_i)$ may be determined based on precomputed power-distance information, precomputed using assumptions regarding generic or default environments and wireless beacon device characteristics. In an example, $$\mathrm{dB} \propto \frac{1}{\log(\text{distance})}$$

Figure 6A:
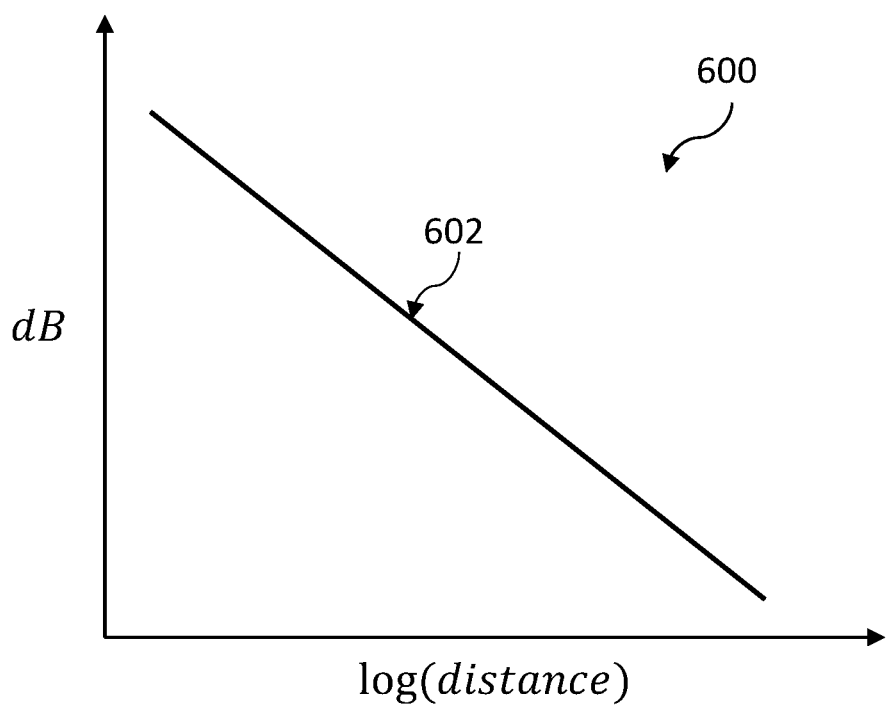
FIGS. 6A-6B are graphs illustrating exemplary power-distance relationships, in accordance with one or more embodiments.
Figure 6B:
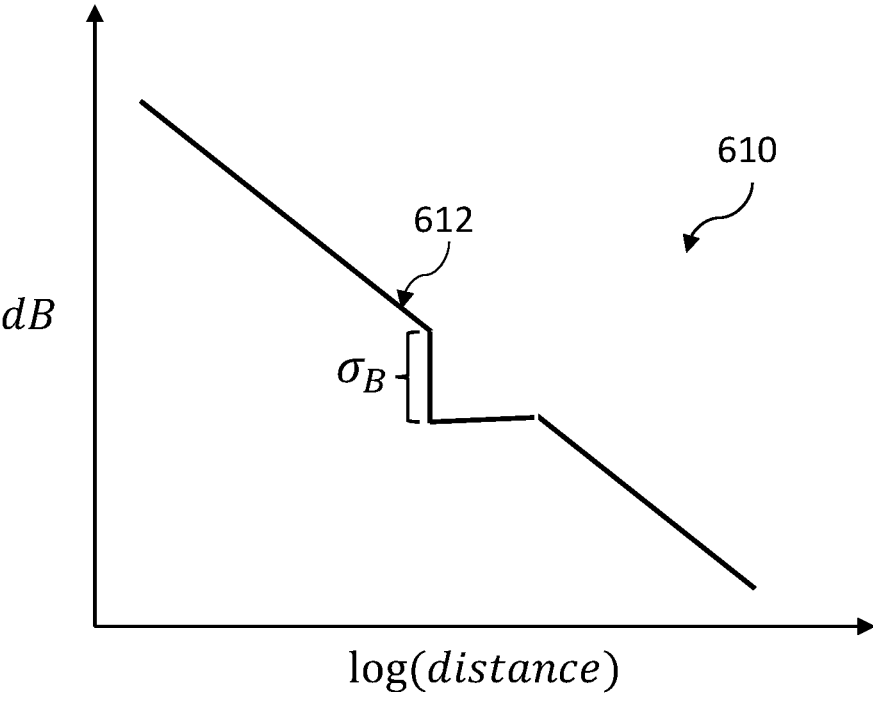

(see, e.g., FIGS. 6A-6B).

In an example, probable beacon locations $\forall_i \in \{B_i\}$ may be compared using:

$$\log Prob(B_i|dB(t)) \propto \log Prob(B_i) + \log Prob(dB(t)|B_i) \propto$$

$$\log Prob(B_i) - \log(\sigma_B) - \frac{1}{2}\log(2\pi) - \frac{1}{2}\left( \frac{dB(t) - f_B(dist_i)}{\sigma_B} \right)^2 \propto$$

$$\log Prob(B_i) - \frac{1}{2}\left( \frac{dB(t) - f_B(dist_i)}{\sigma_B} \right)^2 + K$$

$$K \triangleq -\log\sigma_B - \frac{1}{2}\log(2\pi) = \text{constant}$$

For the wireless beacon, the mapping from a set of calculated distances $\{dist_i\}$ to predicted power readings $\{f_B(dist_i)\}$ for each probable beacon location may be based on the precomputed power-distance information. Said actual power readings, dB(t), (e.g., and associated estimated distances) may be compared with predicted power levels $\{f_B(dist_i)\}$ based on (e.g., as a function of) a set of distances $\{dist_i\}$ as determined by an emergency response navigation system (e.g., including components worn or carried by emergency response personnel, as described herein) using user movement information (e.g., distance and direction moved by the emergency response personnel). In an example, the emergency response navigation system may update $\{dist_i\}$ and $\{f_B(dist_i)\}$ after the emergency response personnel begins moving (e.g., according to a recommended (i.e., next) action, as described herein), the updated $\{dist_i\}$ reflecting a $\{dist_A\}$ with the highest probability may be computed by taking the maximum over all probable beacon locations of:

$$\log Prob(B_i|dB(t)) - \log\left( \sum_i \exp^{\log Prob(B_i|dB(t))} \right)$$

wherein the second term is to normalize $\mathrm{Prob}(B_1|dB(t))$ such that $\Sigma_i \exp^{\log \ Prob(B_i|dB(t))} = 1$. A recommended action, or next action, may comprise a direction based on the highest probable location relative to a current location of the emergency response personnel, as determined by the wireless beacon locator.

In an example, the wireless beacon may comprise a wireless WiFi hotspot configured to be activated on an emergency response personnel's (e.g., firefighter's, disaster personnel's) helmet or other equipment (e.g., as a mayday signal), either by local manual activation by an emergency response personnel (e.g., firefighter) that is "downed" (e.g., fallen and unable to move from the user's location, unconscious, injured) or at a target location with other persons needing rescue. In some examples, the wireless beacon may be activated automatically by a system configured to sense a downed emergency response personnel, or remotely by remote personnel monitoring a status (e.g., health status) of one or more emergency response personnel (e.g., using body-worn or helmet-mounted sensors, communications, etc.).

In other examples, the wireless beacon locator also may be configured to receive additional inputs, either directly or as processed by an emergency response navigation system, including a pre-existing map.

FIG. 1A is a map showing an exemplary wireless beacon location relative to a starting location of a response personnel in a 2D setting, in accordance with one or more embodiments. Map 101 shows wireless beacon 102 in a location in a building. Wireless beacon 102 may transmit a detectable wireless power (e.g., dB). Emergency response personnel 104 may be equipped with an emergency response navigation system comprising navigation artificial intelligence (AI) configured to receive sensor data and other inputs to assist emergency response personnel 104 with navigating a hazardous environment and to communicate with other members of their team, as described herein. Emergency response personnel 104 also may be equipped with a wireless beacon locator configured to recommend a next action (e.g., motion or movement comprising at least a direction) for navigating to wireless beacon 102, using detected (e.g., by a wireless meter) power from wireless beacon 102 and the emergency response navigation system. In some examples, a wireless beacon locator may be implemented as part of the emergency response navigation system. In other examples, the wireless beacon locator may be implemented as a separate module configured to receive inputs from the emergency response navigation system. A wireless beacon locator may be configured to navigate emergency response personnel 104 to wireless beacon 102, for example by the dotted path shown, using a probability model, as described herein.

Figures 1B, 1C:
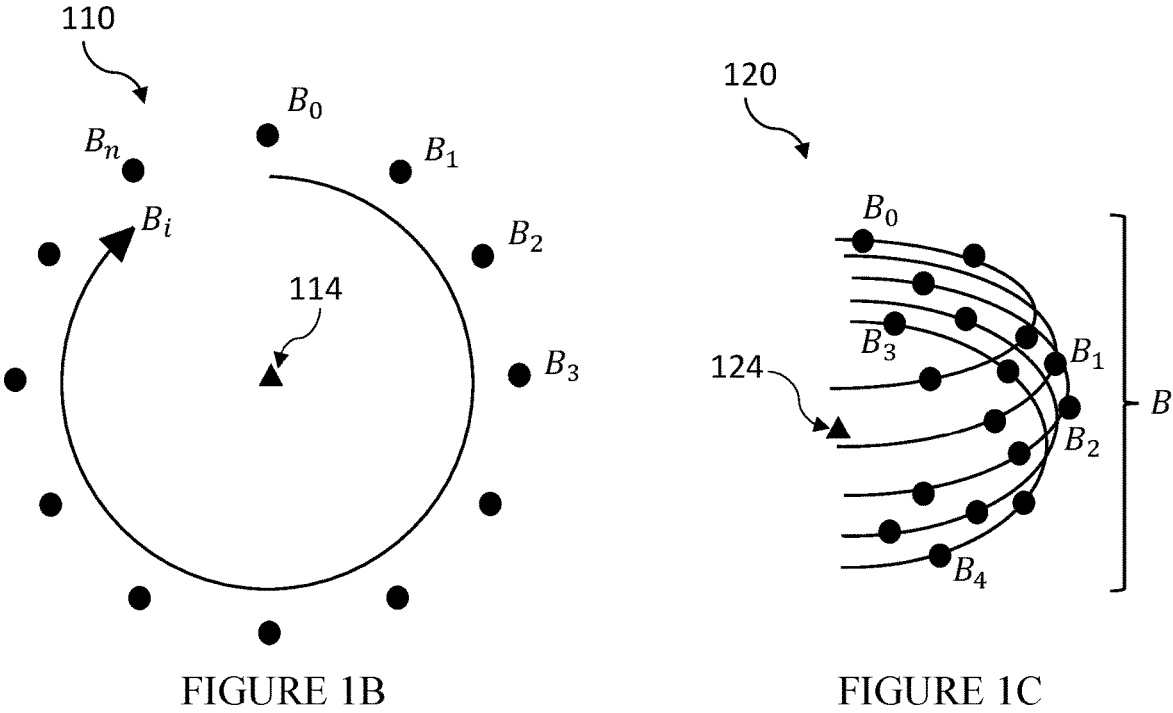
FIG. 1B is a map showing exemplary probable beacon locations determined by a wireless beacon locator in a 2D setting, in accordance with one or more embodiments.
FIG. 1C is a map showing exemplary probable beacon locations determined by a wireless beacon locator in a 3D setting, in accordance with one or more embodiments.

FIG. 1B is a map showing exemplary probable beacon locations determined by a wireless beacon locator in a 2D setting, in accordance with one or more embodiments. Map 110 shows emergency response personnel 114 and a set of probable beacon locations $B_i$ located in a 2D set of directions from a current location of personnel 114, which may include a set from $B_0$ to Bn (e.g., including $B_1$, $B_2$, $B_3$, and other probable beacon locations) in an approximate circular radius relative to the current location of emergency response personnel 114. In some examples, the set from $B_0$ to Bn may comprise a given number of directions (e.g., according to a given angular separation, according to a threshold power reading level). In an example, an initial condition (e.g., when a search for a wireless beacon is initiated), the set from $B_0$ to $B_n$ may comprise a number of directions with the same angular separation between any two of the set from $B_0$ to $B_n$. In some examples, at a point after personnel 114 begins moving, the set from $B_0$ to $B_n$ may change to a subset of the initial set, with $B_i$s being dropped if below a threshold power reading level. In other examples, the set from $B_0$ to $B_n$ may comprise a near-continuous set of possible directions in a 2D space. In some examples, approximate predicted distances of each of probable beacon locations $B_i$ may be determined based on power readings from a wireless beacon (e.g., wireless beacon 102 in FIG. 1A) and precomputed power-distance information.

FIG. 1C is a map showing exemplary probable beacon locations determined by a wireless beacon locator in a 3D setting, in accordance with one or more embodiments. Map 120 shows emergency response personnel 124 and a set of probable beacon locations $B_i$ located in a 3D set of directions from a current location of personnel 124, which may include a set from $B_0$ to $B_n$ (e.g., including $B_1$, $B_2$, $B_3$, $B_4$, and other probable beacon locations) in an approximate spherical radius relative to the current location of emergency response personnel 124. In some examples, the set from $B_0$ to $B_n$ may comprise a given number of directions (e.g., according to a given angular separation, according to a threshold power reading level). In an example, an initial condition (e.g., when a search for a wireless beacon is initiated), the set from $B_0$ to $B_n$ may comprise a number of directions with the same angular separation between any two of the set from $B_0$ to $B_n$. In some examples, at a point after personnel 124 begins moving, the set from $B_0$ to By may change to a subset of the initial set, with one or more of $\{B_i\}$ being dropped if below a threshold power reading level. In other examples, the set from $B_0$ to $B_n$ may comprise a near-continuous set of possible directions in a 3D space. In some examples, approximate predicted distances of each of probable beacon locations $B_i$ may be determined based on power readings from a wireless beacon (e.g., wireless beacon 102 in FIG. 1A) and precomputed power-distance information.

Figure 1D:
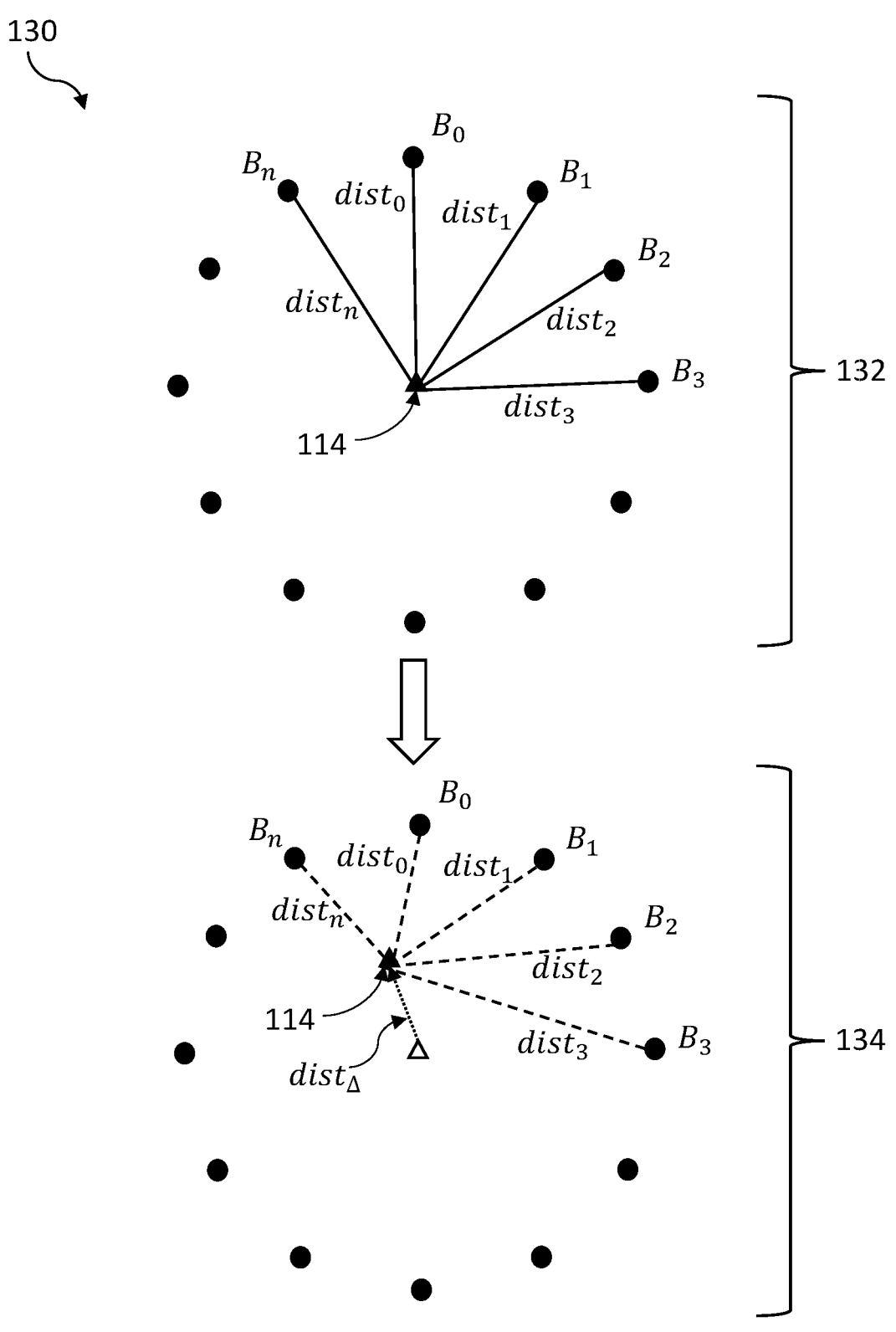
FIG. 1D is a diagram showing updates to distance calculations between a user and the exemplary probable beacon locations from FIG. 1B, in accordance with one or more embodiments.

FIG. 1D is a diagram showing updates to distance calculations between a user and the exemplary the probable beacon locations from FIG. 1B, in accordance with one or more embodiments. In diagram 130, $dist_0$ through $dist_n$ represent a set of $\{dist_i\}$ between user 114 and the set of $\{B_i\}$, for example, $dist_0$ representing a distance between user 114 and probable beacon location $B_0$, $dist_1$ representing a distance between user 114 and probable beacon location $B_1$, $dist_2$ representing a distance between user 114 and probable beacon location $B_2$, $dist_3$ representing a distance between user 114 and probable beacon location $B_3$, and so on. Map 132 shows an exemplary first state wherein the set of $\{dist_i\}$ (e.g., $dist_0$ through $dist_n$) are all approximately equal. Map 134 shows an exemplary second state wherein the set of $\{dist_i\}$ (e.g., $dist_0$ through $dist_n$) are updated based on user movement information $dist_A$ indicating a movement (e.g., change in location) of user 114 (e.g., relative to the set of $\{B_i\}$). The user movement information $dist_A$ may be determined by an emergency response navigation system (e.g., by a processor complex comprising a cognitive enhancement engine configured to process sensor data, as described herein) being worn or carried by user 114. Updated $\{dist_i\}$ may be used to compute and update predicted power level readings, which in turn may be compared with actual power level readings, to generate and update a likelihood probability and/or a posterior probability for each of the set of $\{B_i\}$, according to methods described herein.

Figure 2A:
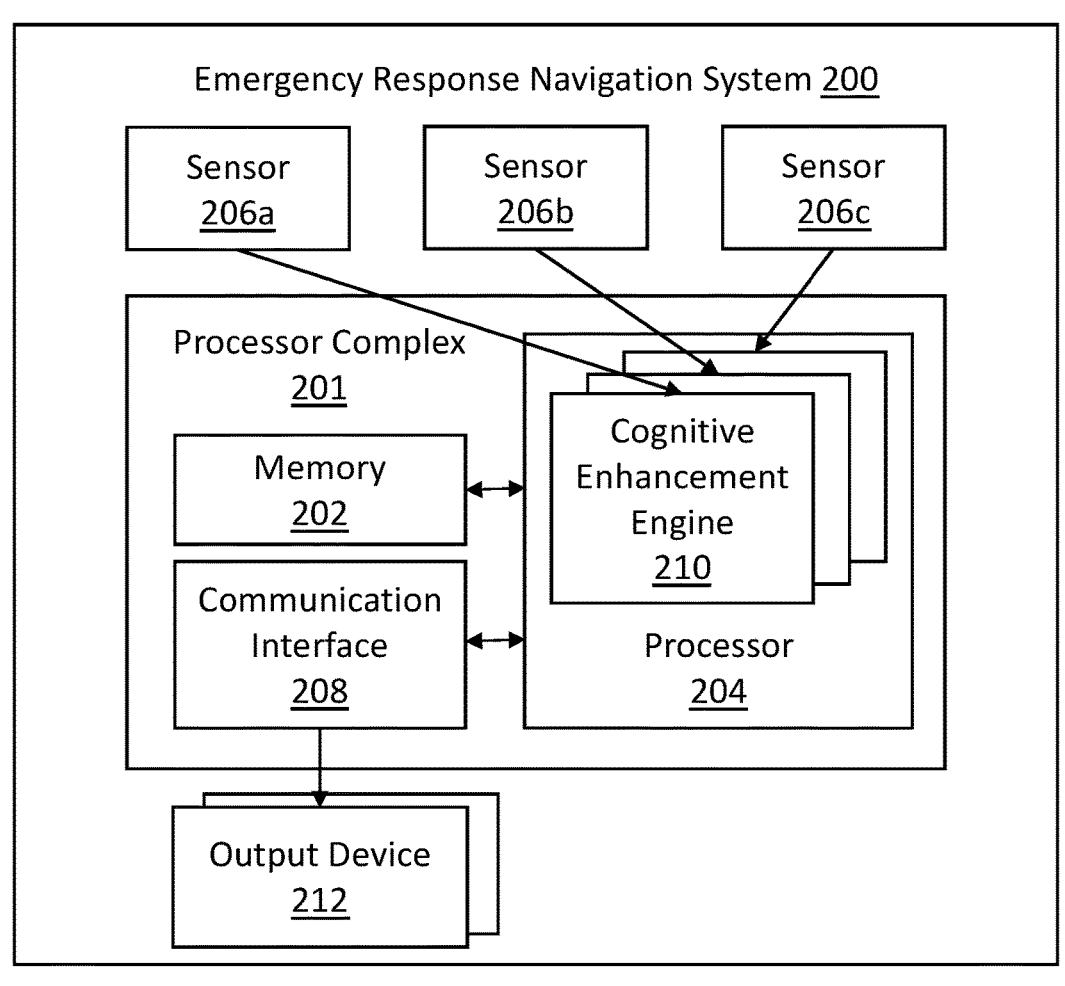
FIG. 2A is a diagram illustrating an exemplary emergency response navigation system comprising a navigation and communications system, in accordance with one or more embodiments.

FIG. 2A is a diagram illustrating an exemplary emergency response navigation system comprising a navigation and communications system, in accordance with one or more embodiments. In some examples, emergency response navigation system 200 may include a wearable electronic system worn on a body or helmet of a user (e.g., emergency response personnel). Emergency response navigation system 200 may comprise one or more sensors 206a-206c (collectively, sensors 206) configured to collect information about an environment as sensor data. The sensor data may be related to a user's environment (e.g., situational awareness sensors) and the user's health status (e.g., biometric sensors), as may be useful for navigation and detecting hazards. For example, situation awareness sensors may measure data relating to the user's external environment for hazard detection and navigation. Sensors 206 may include, but are not limited to: cameras (e.g., a thermal imaging camera (TIC), radiometric thermal camera, drone camera), spectrometer, photosensor, magnetometer, seismometer, gas detector, chemical sensor, radiological sensor, voltage detector, flow sensor, scale, thermometer, pressure sensor, acoustic sensor (e.g., selective active noise cancellation inside a mask to facilitate radio communication), inertial measurement unit (IMU), GPS, speedometer, pedometer, accelerometer, altimeter, barometer, attitude indicator, depth gauge, compass (e.g., fluxgate compass), gyroscope, heart rate sensor, blood pressure monitor, glucose sensor, electrocardiogram (EKG or ECG) sensor, electroencephalogram (EEG) sensor, electromyography (EMG) sensor, respiratory sensor, neurological sensor, NFC tag reader, RFID tag reader, scanner, and the like. In some examples, one or more of sensors 206 may be worn by a user on their body, helmet, and other equipment. In other examples, one or more of sensors 206 may be remote from a user, for example on a drone and/or other autonomous (e.g., robotic) device or vehicle.

System 200 also may include a processor complex 201, including memory 202, communication interface 208, and processor 204 configured to implement a software-based cognitive enhancement engine 210. In some examples, processor 204 may comprise one or more graphics processor units (GPUs). Cognitive enhancement engine 210 may be configured to process sensor data from sensors 206 to generate enhanced characterization data for presenting (e.g., outputting) contextual and physiological visual, auditory, and/or haptic cues to a user (e.g., via output device 212). In some examples, the enhanced characterization data comprises information that selectively highlights and characterizes the user's environment and/or health status (e.g., a simplified directional map, a heat map, one or more symbols, outlines of objects, color coding, an audio cue (e.g., sound, word, message, alert), a haptic cue, and the like) in a manner that may be quickly recognized by the user (e.g., a trained emergency response personnel) so that they may efficiently take appropriate action. In some examples, enhanced characterization data may be generated by performing edge detection on sensor data to declutter raw thermal images by highlighting contour and shape information to assist a user with efficient navigation. In some examples, enhanced characterization data may be displayed as augmented reality video.

Memory 202 may store sensor data collected from one or more of sensors 206 and also may store cognitive enhancement engine 210 for implementing processes as described herein when executed by processor 204. In some examples, cognitive enhancement engine 210 may comprise a plurality of modules.

System 200 also may include one or more output devices 212 coupled to processor 204. Output devices 212 may be configured to communicate enhanced characterization data to a user. For example, output devices 212 may be implemented as one, or a combination of, a visual display, headphones, ear buds, and a haptic device. The enhanced characterization data may be integrated into the natural senses of a user in a manner that is optimized for performance of a task, including navigating to a wireless beacon as described herein.

Figure 2B:
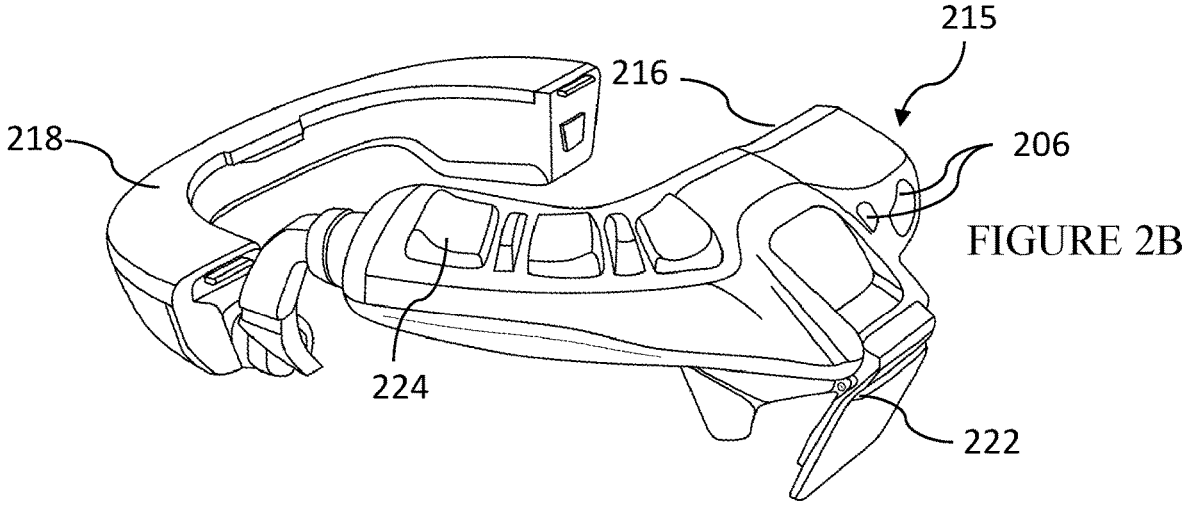
FIG. 2B is a diagram illustrating components of an exemplary navigation and communications system in an emergency response gear system, in accordance with one or more embodiments.

FIG. 2B is a diagram illustrating components of an exemplary navigation and communications system in an emergency response gear system, in accordance with one or more embodiments. In some examples, emergency response navigation system 200 may be implemented, at least in part, in navigation and communications system 215. In some examples, navigation and communications system 215 may include modules 216 and 218. Module 216 may be configured for providing input and output (e.g., input using buttons 224, output using heads-up display (HUD) 222), as well as carrying one or more sensors (e.g., sensors 206). In some examples, output device 212 in FIG. 1 may comprise HUD 222. Module 218 may comprise compute and power functions, for example, to implement processor complex 201. A user may be able to use buttons 224 to provide inputs to processor 201 (e.g., as may be housed in module 218), as well as to control displays on HUD 222 (e.g., toggle between display content and/or screens). In some examples, module 218 also may include one or more sensors 206 (not shown). In some examples, navigation and communications system 215 may be configured to be mounted onto a helmet and/or otherwise worn by an emergency response personnel.

Figure 2C:
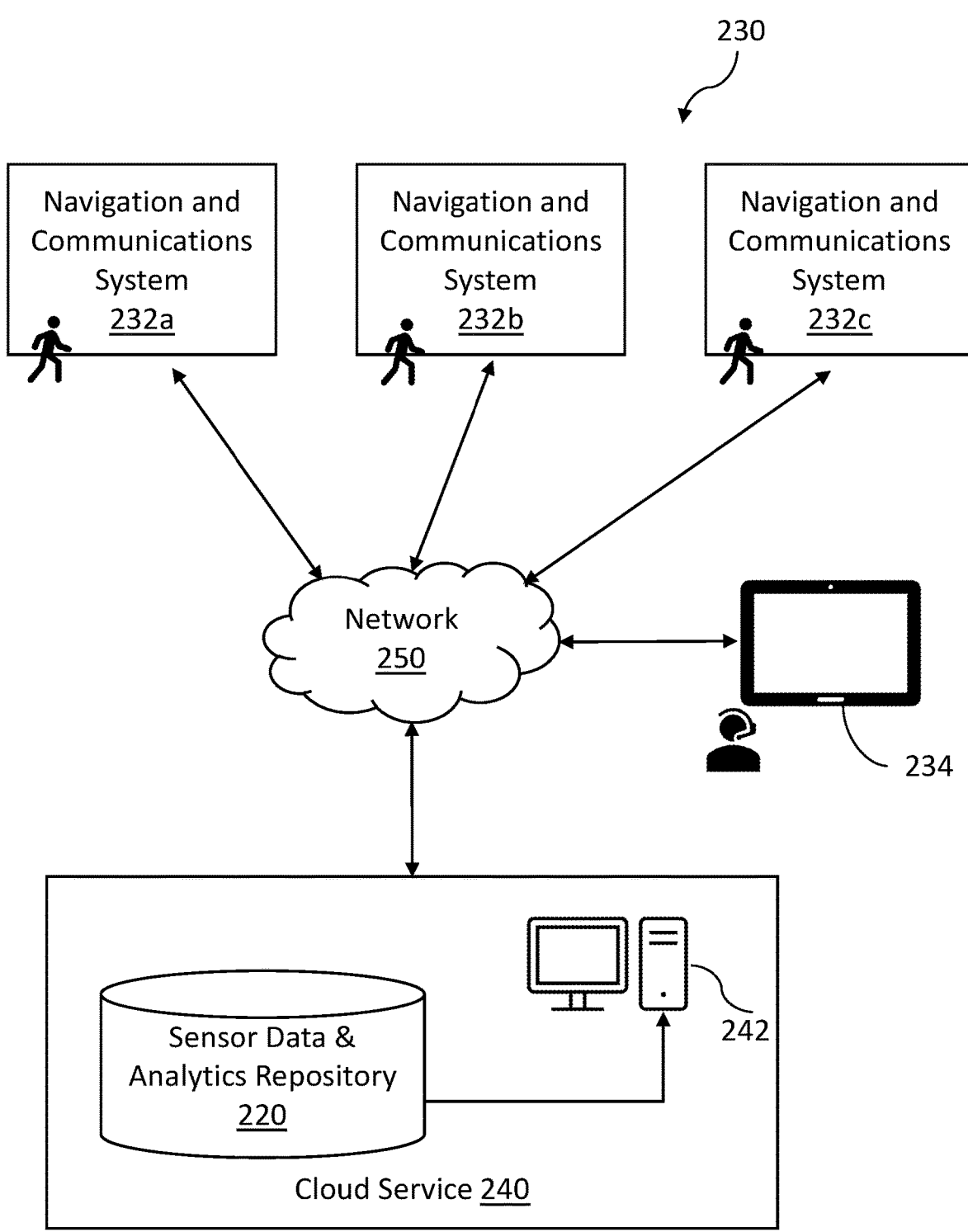
FIG. 2C is a diagram illustrating components of an exemplary emergency response navigation system in a back-end data aggregation and analytics system, in accordance with one or more embodiments.

FIG. 2C is a diagram illustrating components of an exemplary emergency response navigation system in a back-end data aggregation and analytics system, in accordance with one or more embodiments. Diagram 230 shows navigation and communications systems 232a-232c being worn or carried by a user in the field (e.g., an emergency response personnel in a hazardous environment, disaster area, etc.). One or more of navigation and communications system 232a-232c may be configured to communicate with command and control interface device 234, for example, using network 250. In some examples, raw sensor data may be received by navigation and communications systems 232a-232c using one or more sensors. As described herein, navigation and communications systems 232a-232c may be processed into enhanced characterization data for a user. In some examples, command and control interface device 234 may be configured to receive one or more of telemetry data, sensor data, and enhanced characterization data from each of the navigation and communications systems 232a-232c. In some examples, command and control interface 234 may be further configured to construct a map of an area or structure based on telemetry data and sensor data received from navigation and communications systems 232a-232c. In an example, radiometric thermal data may be used to indicate hot spots on a constructed map, which may then be shared back to navigation and communications systems 232a-232c.

Command and control interface device 234 may be configured to transmit said telemetry data, sensor data, and/or enhanced characterization data to cloud service 240 (e.g., through network 250). Cloud service 240 may include sensor data and analytics repository 220 and one or more server(s) 242. Server(s) 242 may be configured to perform data aggregation and analytics, including archiving telemetry data and sensor data in sensor data and analytics repository 220. In some examples, additional data may be aggregated by cloud service 240 to provide additional information to command and control interface 234, which may perform command and control functions relating to navigation and communications system 232a-232c (e.g., instructions, messaging, mapping, alerts). Such additional data may comprise various types of maps, weather conditions, building schematics (e.g., blueprints), time, building management systems information (e.g., security systems, power systems, ventilation, lighting, electrical, thermostats, elevator status, and the like). Some of this additional information may be used to aid in predictive analytics, such as locating a wireless beacon as described herein.

Figure 3A:
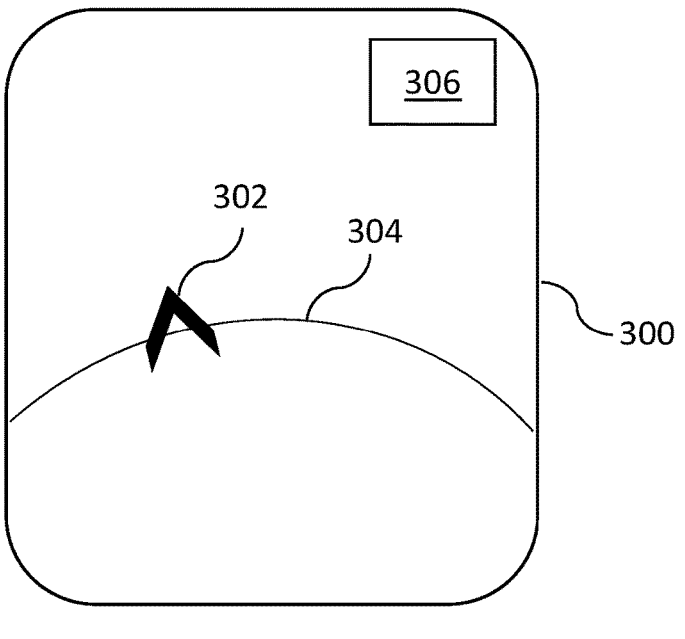
FIGS. 3A-3B are displays showing exemplary recommended navigation actions, in accordance with one or more embodiments.
Figure 3B:
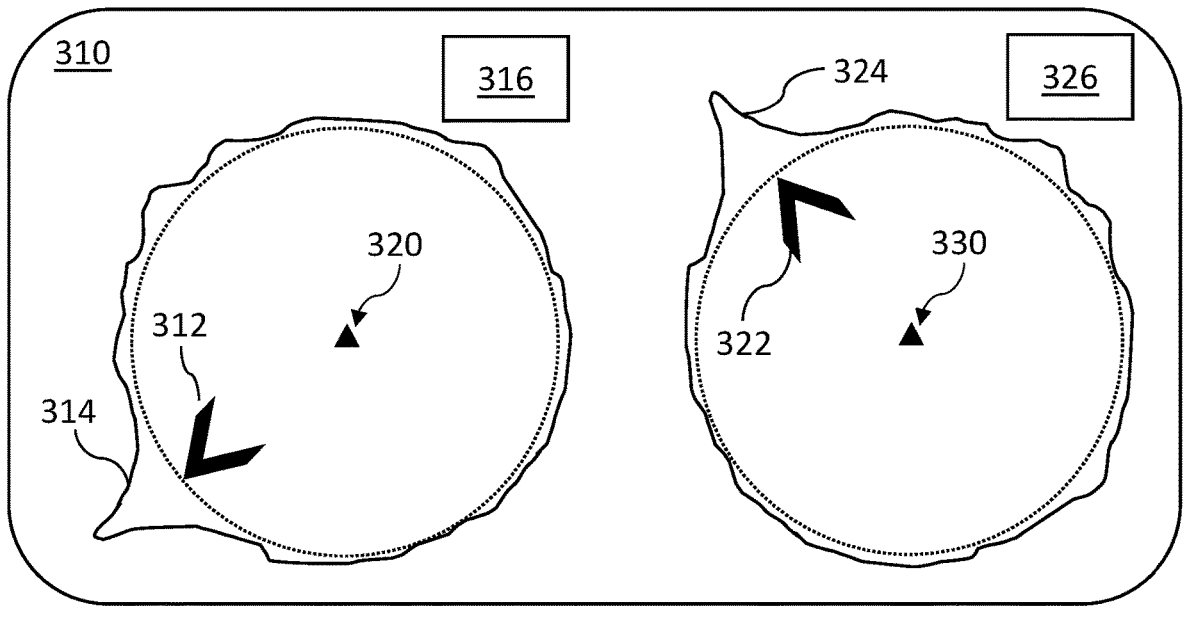

FIGS. 3A-3B are displays showing exemplary recommended navigation actions, in accordance with one or more embodiments. Displays 300 and 310 may comprise options for display on an output device (e.g., HUD 222 in FIG. 2B, command and control interface 234) to assist a user (e.g., emergency response personnel) to navigate to a wireless beacon. On display 300, an arrow icon (e.g., chevron) 302 may move along arc 304 to indicate an approximate direction for a user to move in. This recommended direction may comprise the output of a recommended navigation action, as generated by a wireless beacon locator, as described herein. A graphic 306 may be provided in any open space on display 300 to indicate other information that may be used to locate a wireless beacon (e.g., distance, time, environment status, user status, wireless beacon status, health status of personnel having (e.g., wearing or otherwise carrying) the wireless beacon, and the like). Alternatively, display 310 may be configured to display navigation information relating to one or more users (e.g., emergency personnel team members), for example in a command and control interface 234). For example, a 2D radius may be shown around user icons 320 and 330 with lines 314 and 324 representing relative beacon location probabilities for each of users 320 and 330, respectively, with peaks and valleys relative to the dotted line radius indicating a strength (e.g., value) of beacon location probability in a given direction, the highest peak indicating a highest probable location direction. Chevrons 312 and 322 may be provided to more clearly indicate an approximate direction for the user to move, for example as a recommended navigation action generated by a wireless beacon locator, as described herein. A graphic 316 may be provided similarly to graphic 306 to indicate other information to assist in locating the wireless beacon and/or to provide other information about users 320 and 330 (e.g., identification, role, health status, etc.). In other examples, an individual user's version and/or simplified version of display 310 may be provided on an HUD.

Figure 4:
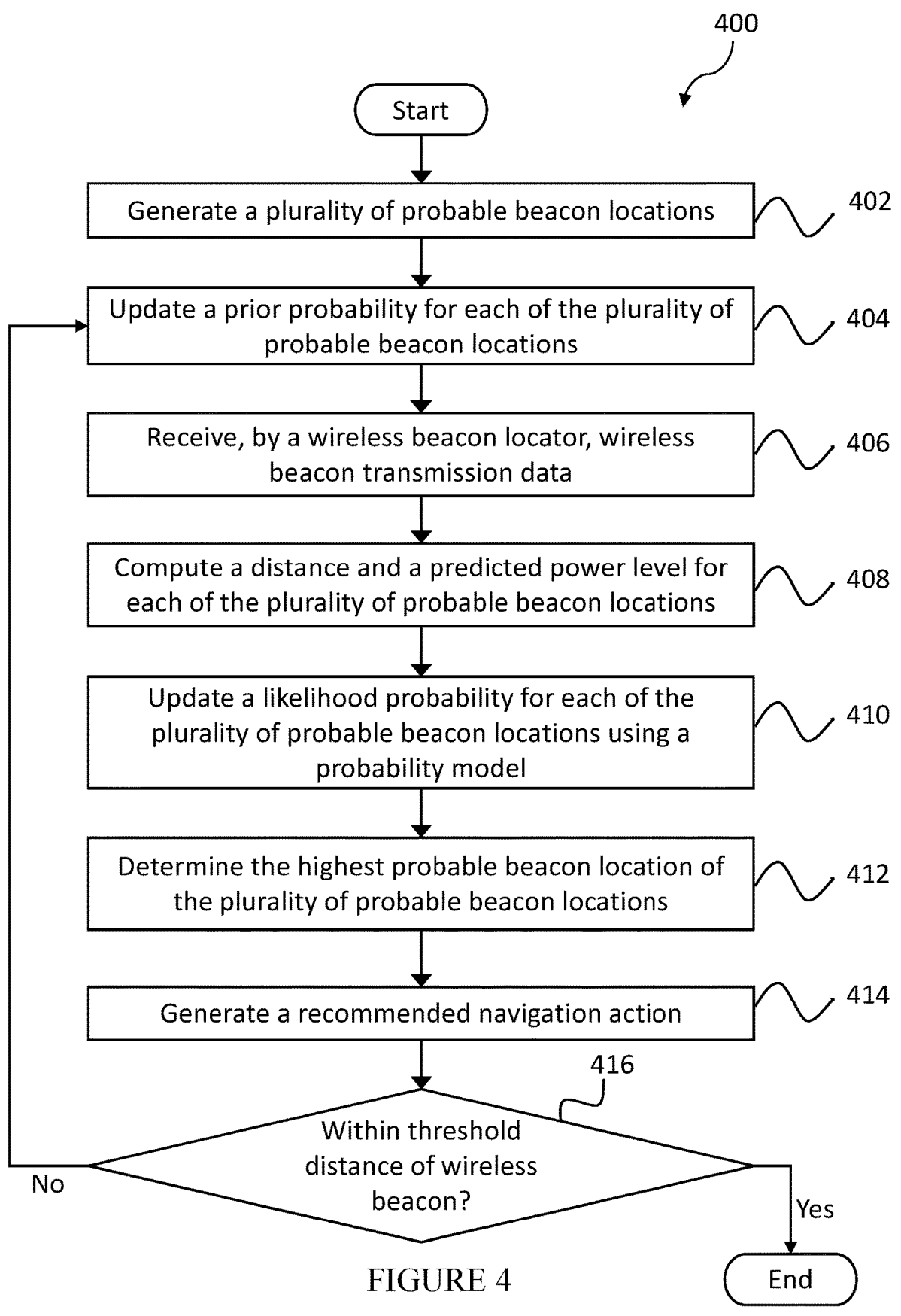
FIG. 4 is a flow chart illustrating an exemplary method for navigating to a wireless beacon location, in accordance with one or more embodiments.

FIG. 4 is a flow chart illustrating an exemplary method for navigating to a wireless beacon location, in accordance with one or more embodiments. Method 400 may begin with generating a plurality of probable beacon locations at step 402. As an initial condition, the plurality of probable beacon locations (e.g., the set $\{B_i\}$ in FIGS. 1B-1C) may comprise a set of locations in a plurality of directions (e.g., 2D or 3D) from a user (e.g., emergency response personnel). The set of locations may comprise an estimated distance to the wireless beacon location from the user's current location, for example, based on pre-computed distances and/or maps. A prior probability for each of the plurality of probable beacon locations may be updated at step 404. In some examples, the prior probability may comprise initially a default set of prior probabilities, for example, the same or similar prior probability for the plurality of probable beacon locations and/or a slight preference (e.g., higher probability) for a current facing direction of the user, as may be determined by an emergency response navigation system being worn or carried by the user. In other examples, the prior probability may be updated based on a previously determined posterior probability for a given probable beacon location. Wireless beacon transmission data may be received, by a wireless beacon locator at step 406. Wireless beacon transmission data may include power readings dB, among other data and metadata from a wireless beacon (e.g., device characteristics, identification, and the like). In some examples, an estimated distance may be determined based on the received wireless beacon transmission data comprising a power reading and precomputed power-distance information. A distance and a predicted power level may be computed for each of the plurality of probable beacon locations at step 408, the predicted power level being a function of the distance as determined by an emergency response navigation system based on user movement information. A likelihood probability may be updated for each of the plurality of probable beacon locations using a probability model at step 410, based on at least the predicted power level and the wireless beacon power reading. In some examples, a posterior probability also may be determined proportional to the prior probability and likelihood probability. Given a time history of detected power (e.g., two or more power readings from the wireless beacon transmission data), as well as a time history of user movement information, the predicted power levels (e.g., as a function of distance determined by the emergency response navigation system) will vary between the probable beacon locations thereby changing the likelihood probability and the posterior probability between the plurality of probable beacon locations. The highest probable beacon location of the plurality of probable beacon locations may be determined at step 412, for example, based on the predicted power level and the wireless beacon power reading for each of the probable beacon locations. A recommended navigation action may be generated at step 414. In some examples, the recommended navigation action may include a direction for the user to move, as may be indicated on a display (e.g., HUD 222, command and control interface 234, and the like). In some examples, given an initial or default set of prior probabilities and wireless beacon transmission data (e.g., same or similar for all probable beacon locations), the likelihood probabilities for the set also may be the same or similar and/or there may not be a highest probable beacon location, in which case the recommended navigation action generated at step 414 may be determined at random or based on a default parameter (e.g., a direction the user is currently facing, as may be determined by the emergency response navigation system).

A determination may be made at step 416 whether the user is within a threshold distance of the wireless beacon. The threshold distance may be a predetermined distance within which the user may be in visual contact with the wireless beacon location, for example, in a hazardous environment with relatively low visibility (e.g., due to smoke, debris, or other obstacles). If the user is not within the threshold distance (e.g., query response "no"), the process returns to updating the prior probability for each of the plurality of probable beacon locations at step 402. In some examples, an updated prior probability for a given probable beacon location may comprise, or at least be based on, a previous posterior probability for the given probable beacon location. In some examples, wireless beacon transmission data may be continuously or periodically received by the wireless beacon locator. If, at step 416, the user is within the threshold distance (e.g., query response "yes"), then the process can end.

In other examples, method 400 may include eliminating a probable beacon location from the set of probable beacon locations comprising the plurality of probable beacon locations when its associated prior probability and/or likelihood probability falls below a given probability threshold. In this case, the process may end when the plurality of probable beacon locations has been narrowed down to a threshold number of probable beacon locations (e.g., depending on an angular, linear, arc length, or other distance between the probable beacon locations, as well as other factors like visibility distance and density or placement of obstacles). For example, the threshold number of probable beacon locations may be one (1) if the distance between probable beacon locations is far enough apart. In another example, if the distance between probable beacon locations is closer, the process may end when narrowed to a threshold number of probable beacon locations greater than one (1) (e.g., two or more, 1%-2% of an initial set of probable beacon locations, or other subset of the initial set of probable beacon locations).

Using the methods described herein, a wireless beacon locator is able to narrow down a set of probable beacon locations to one or a few probable beacon locations based on changes in wireless beacon power readings over time and actual changes in distance probable beacon locations over time, as determined by an emergency response navigation system comprising a navigation AI configured to track a user's trajectory within an environment (e.g., distance and direction traveled by the user).

Figure 5A:
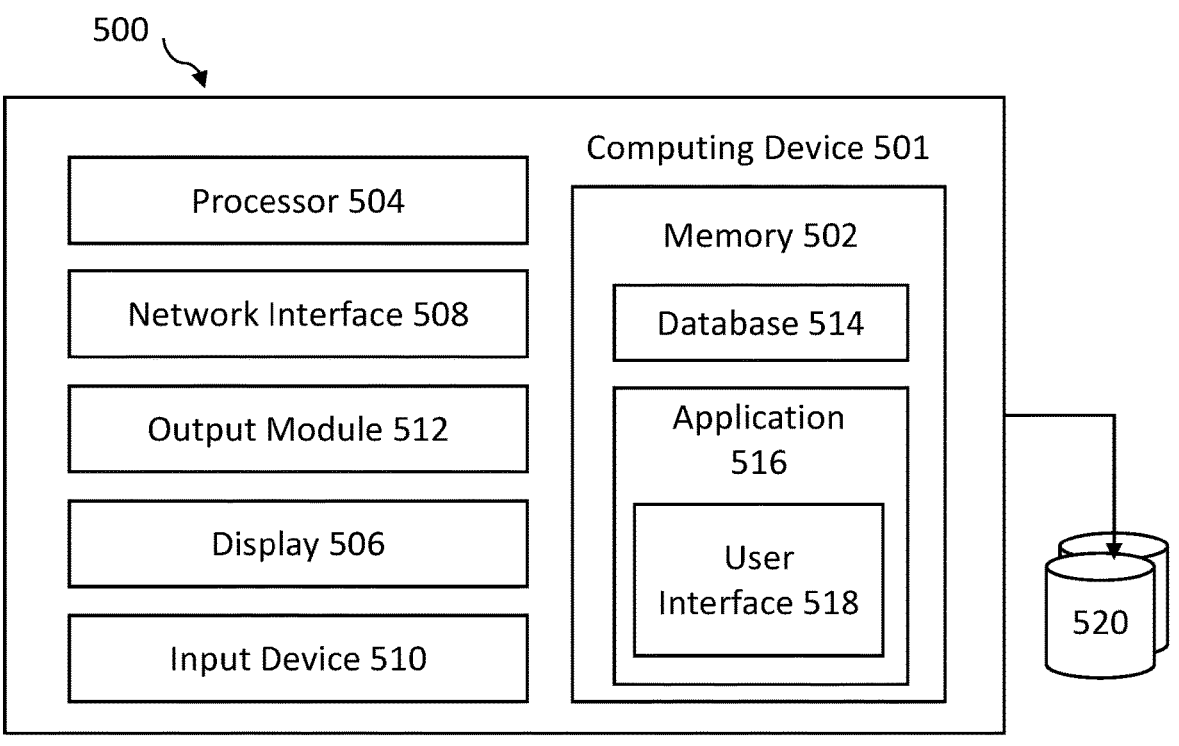
FIG. 5A is a simplified block diagram of an exemplary computing system configured to perform steps of the method illustrated in FIG. 4 and implement the systems shown in FIGS. 2A-2C, in accordance with one or more embodiments.

FIG. 5A is a simplified block diagram of an exemplary computing system configured to perform steps of the method illustrated in FIG. 4 and implement the systems shown in FIGS. 2A-2C, in accordance with one or more embodiments. In one embodiment, computing system 500 may include computing device 501 and storage system 520. Storage system 520 may comprise a plurality of repositories and/or other forms of data storage, and it also may be in communication with computing device 501. In another embodiment, storage system 520, which may comprise a plurality of repositories, may be housed in one or more of computing device 501. In some examples, storage system 520 may store sensor data, telemetry data, enhanced characteristics data, map data, biometric data, networks, instructions, programs, and other various types of information as described herein. This information may be retrieved or otherwise accessed by one or more computing devices, such as computing device 501, in order to perform some or all of the features described herein. Storage system 520 may comprise any type of computer storage, such as a hard drive, memory card, ROM, RAM, DVD, CD-ROM, write-capable, and read-only memories. In addition, storage system 520 may include a distributed storage system where data is stored on a plurality of different storage devices, which may be physically located at the same or different geographic locations (e.g., in a distributed computing system such as system 550 in FIG. 5B). Storage system 520 may be networked to computing device 501 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 501, which in some examples may be included in emergency response navigation system 200, navigation and communication systems 215 and 232a-232c, command and control device 234 and/or cloud service 240, also may include a memory 502. Memory 502 may comprise a storage system configured to store a database 514 and an application 516. Application 516 may include instructions which, when executed by a processor 504, cause computing device 501 to perform various steps and/or functions (e.g., implementing a wireless beacon locator, a navigation and communications system, a command and control device), as described herein. Application 516 further includes instructions for generating a user interface 518 (e.g., displays on HUD 222, command and control device 234). Database 514 may store various algorithms (e.g., beacon probability prediction algorithms) and/or data, including neural networks (e.g., for implementing an intelligent navigation system), sensor data, telemetry data, and other navigation data. Memory 352 may include any non-transitory computer-readable storage medium for storing data and/or software that is executable by processor 504, and/or any other medium which may be used to store information that may be accessed by processor 504 to control the operation of computing device 501.

Computing device 501 may further include a display 506 (e.g., displays on HUD 222, command and control device 234), a network interface 508, an input device 510, and/or an output module 512. Display 506 may be any display device by means of which computing device 501 may output and/or display data. Network interface 508 may be configured to connect to a network using any of the wired and wireless short range communication protocols described above, as well as a cellular data network, a satellite network, free space optical network and/or the Internet. Input device 510 may comprise buttons (e.g., buttons 224), a mouse, keyboard, touch screen, voice interface, and/or any or other hand-held controller or device or interface by means of which a user may interact with computing device 501. Output module 512 may be a bus, port, and/or other interfaces by means of which computing device 501 may connect to and/or output data to other devices and/or peripherals.

In one embodiment, computing device 501 is a data center or other control facility (e.g., configured to run a distributed computing system as described herein), and may communicate with a wireless beacon locator, navigation and communications system, command and control device, and other systems and devices described herein. As described herein, system 500, and particularly computing device 501, may be used for computing probabilities, generating probable beacon locations, processing sensor data, generating recommended navigation actions, and otherwise implementing steps for locating a wireless beacon, as described herein. Various configurations of system 500 are envisioned, and various steps and/or functions of the processes described below may be shared among the various devices of system 500 or may be assigned to specific devices.

Figure 5B:
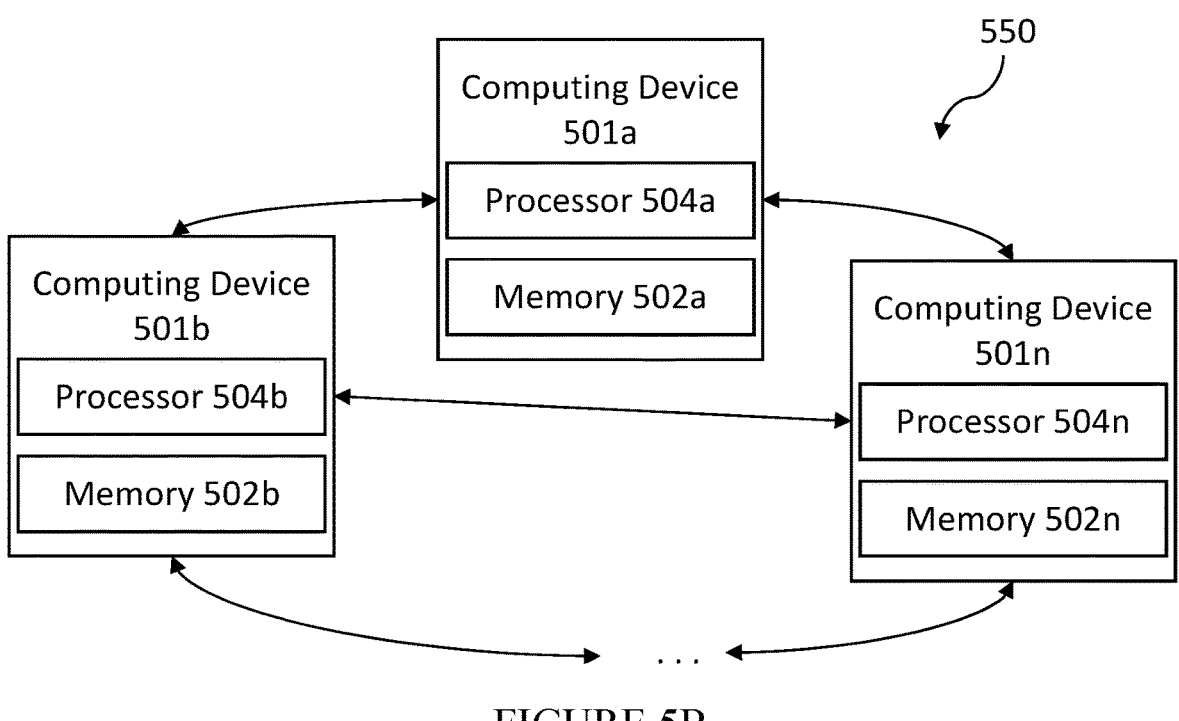
FIG. 5B is a simplified block diagram of an exemplary distributed computing system implemented by a plurality of the computing devices in FIG. 5A, in accordance with one or more embodiments.

FIG. 5B is a simplified block diagram of an exemplary distributed computing system implemented by a plurality of the computing devices in FIG. 5A, in accordance with one or more embodiments. System 550 may comprise two or more computing devices 501a-n. In some examples, each of 501a-n may comprise one or more of processors 504a-n, respectively, and one or more of memory 502a-n, respectively. Processors 504a-n may function similarly to processor 504 in FIG. 5A, as described above. Memory 502a-n may function similarly to memory 502 in FIG. 5A, as described above.

FIGS. 6A-6B are graphs illustrating exemplary power-distance relationships, in accordance with one or more embodiments. In FIG. 6A, graph 600 shows a power-distance relationship as represented by line 602. In FIG. 6B, graph 602 shows a power-distance relationship including noise modeled by OB as represented by line 612. Noise OB may be used to model a drop in power readings dB that may be caused by a barrier (e.g., a physical wall, ceiling, object). In some examples, noise OB may be further informed by additional information and data, for example, maps and building schematics as may be provided by a command and control device or a backend cloud service, as described herein. In some examples, graphs 600 and/or 602 may comprise pre-computed data that may be used to estimate a distance based on actual received wireless power readings, as described herein. In some examples, graphs 600 and/or 602 may additionally or alternatively be used to predict wireless power readings (e.g., for predicted likelihood probabilities) based on distances determined from actual user movement information, as described herein.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for navigating a user to a wireless beacon, the method comprising:

generating a plurality of probable beacon locations of a wireless beacon;

updating a prior probability for each of the plurality of probable beacon locations;

receiving, by a wireless beacon locator, wireless beacon transmission data comprising a power level associated with the wireless beacon, the wireless beacon locator comprising a wireless meter able to detect the power level of the wireless beacon from which an actual power reading is determined;

determining a distance and a predicted power level for each of the probable beacon locations based on precomputed power-distance information, the predicted power level being a function of the distance as determined by an emergency response navigation system based on user movement information;

updating a likelihood probability for each of the plurality of probable beacon locations using a Bayesian probability model, based on at least a comparison of the predicted power level and the actual power reading;

determining a highest probable beacon location of the plurality of probable beacon locations using the Bayesian probability model, the Bayesian probability model configured to determine the highest probable beacon location based on the precomputed power-distance information and a time history of detected actual power readings; and generating a recommended navigation action.

2. The method in claim 1, further comprising:

receiving updated wireless beacon transmission data comprising an updated wireless beacon power reading;

computing an updated distance and an updated predicted power level for each of the probable beacon locations based on updated user movement information determined by the emergency response navigation system; and updating the likelihood probability for the plurality of probable beacon locations based on at least the updated predicted power level and the updated wireless beacon power reading.

3. The method in claim 1, wherein the wireless beacon comprises a Wi-Fi hotspot.

4. The method of claim 1, wherein the plurality of probable beacon locations comprises a plurality of locations within a circular radius of the user.

5. The method of claim 1, wherein the plurality of probable beacon locations comprises a plurality of locations within a spherical radius of the user.

6. The method of claim 1, wherein the recommended navigation action comprises a recommended direction.

7. The method of claim 6, further comprising displaying an indication of the recommended direction relative to the user.

8. The method of claim 7, wherein the indication of the recommended direction is displayed using an arrow icon on a heads-up display (HUD).

9. The method of claim 1, wherein updating the likelihood probability for the plurality of probable beacon locations comprises modeling a noise factor, wherein the noise factor represents one or more obstacles.

10. The method of claim 1, further comprising receiving additional input, wherein determining the highest probable beacon location may be based further on the additional input.

11. The method of claim 10, wherein the additional input comprises a map.

12. The method of claim 10, wherein the additional input comprises a building schematic.

13. The method of claim 10, wherein the additional input comprises a weather condition.

14. A system for navigating to a wireless beacon comprising:

a wireless meter configured to detect a power level of a wireless beacon and to provide an actual power reading;

a memory configured to store instructions and data; and a processor communicatively coupled to the memory, the processor configured to execute instructions to:

generate a plurality of probable beacon locations of the wireless beacon;

update a prior probability for each of the plurality of probable beacon locations;

receive, by a wireless beacon locator, wireless beacon transmission data comprising power level associated with the wireless beacon;

determine a distance and a predicted power level for each of the probable beacon locations based on precomputed power-distance information, the predicted power level being a function of the distance as determined by an emergency response navigation system based on user movement information;

update a likelihood probability for each of the plurality of probable beacon locations using a Bayesian probability model, based on at least a comparison of the predicted power level and the actual power reading;

determine a highest probable beacon location of the plurality of probable beacon locations using the Bayesian probability model, the Bayesian probability model configured to determine the highest probable beacon location based on the precomputed power-distance information and a time history of detected actual power readings; and generate a recommended navigation action.

15. The system in claim 14, wherein the wireless beacon comprises a WiFi hotspot.

16. The system in claim 14, wherein the wireless beacon is activated automatically based on a health status of a user having the wireless beacon.

17. The system of claim 16, wherein the health status indicates the user is downed and unable to move from the user's location.

18. The system of claim 16, wherein the health status indicates the user is unconscious.

19. The system of claim 14, wherein the wireless beacon is activated manually by a user having the wireless beacon.

20. The system of claim 14, wherein the wireless beacon is activated remotely by a command and control device used to monitor a health status of a user having the wireless beacon.

* * * * *